United States Patent Office 2,912,261
Patented Nov. 10, 1959

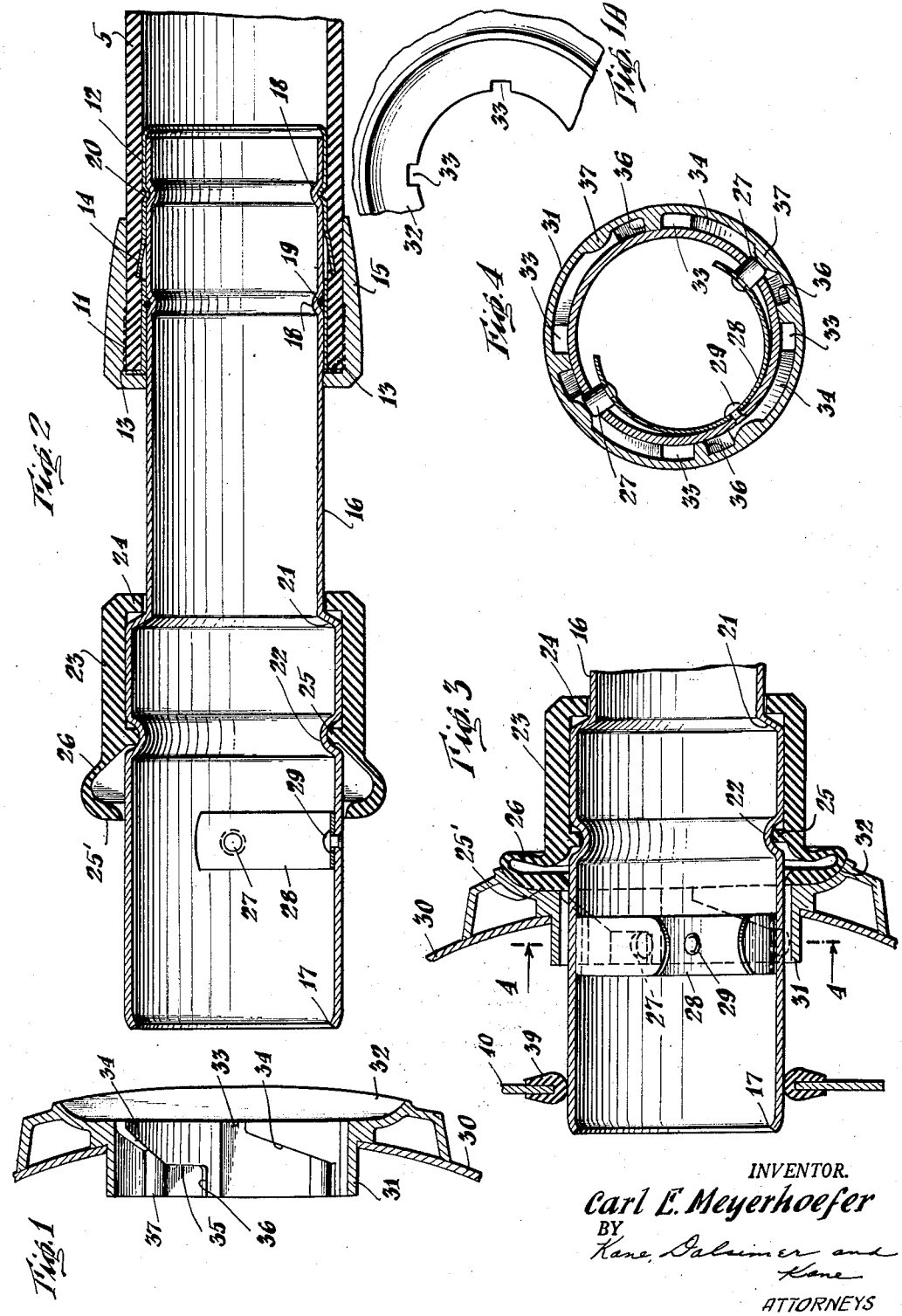

2,912,261

LUGGED-PIPE TYPE COUPLING WITH EXTERNAL SEALING MEANS

Carl E. Meyerhoefer, Little Neck, N.Y., assignor to Lewyt Corporation, Brooklyn, N.Y., a corporation of New York Substituted for abandoned application Serial No. 351,072, April 27, 1953. This application April 24, 1956, Serial No. 580,374

4 Claims. (Cl. 285—7)

This invention relates to a structurally and functionally improved coupling capable of use in numerous different associations but primarily intended to be employed in connection with air-flow apparatus such as vacuum cleaners.

This application is a continuation of my prior application for United States Letters Patent on "Coupling" filed on April 27, 1953, and identified in the Patent Office records under Serial Number 351,072.

It is an object of the invention to furnish a structure of this nature which may serve to couple, for example, the hose of an assembly with a vacuum cleaner apparatus at either the suction or exhaust openings of the latter or both. So used, it will provide a mechanism which may readily be manipulated by a completely unskilled person to readily effect a connection or disconnection of the hose.

A further object is that of providing a coupling which—with the parts assembled—will result in a unitary and substantially rigid structure so that objections incident to play or movement occurring within the assembly will be avoided. Also, coincident with the establishment of the coupling, the operator will know that undesired leakages are avoided, without it being necessary to resort to any manipulation of the parts to assure this result other than that necessary to effect the coupling.

Still another object is that of designing an assembly of this type which will include relatively few elements, each individually simple and rugged in construction and capable of manufacture by quantity production methods; such elements being capable of ready association to furnish a unitary structure operating over long periods of time with freedom from all difficulties.

With these and other objects in mind, reference is had to the attached sheets of drawings illustrating practical embodiments of the invention and in which:

Fig. 1 is a side view of a fragment of the outer shell or casing of a vacuum cleaner apparatus and taken in section through the zone of one of the openings formed therein;

Fig. 1A is a fragmentary face view of the parts as shown in Fig. 1;

Fig. 2 is a longitudinal sectional view of the end portion of a hose and illustrating the parts of a coupling associated therewith;

Fig. 3 shows the parts illustrated in Figs. 1 and 2, with the coupling structure operative; and Fig. 4 is a transverse sectional view taken along the line 4—4 in the direction of the arrows as indicated in Fig. 3.

Referring primarily to Fig. 2, the reference numeral 5 indicates the end portion of a hose which may be formed of any desirable material and embrace, for example, rubber and spring wire re-enforced construction. The outer face of the hose adjacent its end edge conveniently has applied to it a layer of protecting tape 11 so as to enclose that surface and prevent any accidental fraying of the same. The bore of the hose may have applied to it a tube 12. The outer end of this tube overlaps the adjacent hose edge as at 13. Teeth or pawls 14 are struck from the tube so that as the latter is forced into the hose bore, these teeth will engage against the surface of the same and prevent a retraction and detachment of the tube. A fitting 15 of any suitable material such as metal or rubber may be ensleeved over tube 12. This will further secure the assembly and also a proper finished appearance of the parts results.

A hose extension 16 in the form of a pipe section has its outer end enlarged and beyond which it is preferably reduced as indicated at 17. Adjacent its opposite end it is conveniently formed with a pair of channel portions 18. Within one of these a packing ring or element 19 may be disposed. The tube 12 is formed with an instruck portion or channel 20 which aligns with the second channel 18 disposed adjacent the outer end of pipe 16. This will prevent axial movement of the parts with respect to each other. The packing ring 19 will prevent air leakage. Therefore, the hose extension is supported for rotation with respect to the hose but at the same time is permanently and properly attached to the latter.

Pipe 16 is enlarged adjacent that end which is opposite its zone of connection with the hose. This enlargement may be defined by a shoulder 21. Spaced outwardly of that shoulder is a channel 22. A bushing preferably of rubber includes a cylindrical body 23 presenting adjacent one edge an inwardly extending flange 24. That flange bears against shoulder 21. Intermediate its edges, it preferably has a flange 25 which bears within channel 22 of hose extension. The edge of the bushing opposite flange 24 terminates in a lip or contact portion 25', which, adjacent its point of connection with the body 23 of the bushing, may be reduced as at 26 to provide a quite flexible support for the lip portion. The hose extension at a point beyond the lip is formed with a pair of openings at diametrically opposite points. Pins 27 extend through these openings and are preferably supported in this position by the ends of an arcuate spring 28 secured within the bore of the extension by, for example, a rivet 29. These pins form a part of a retaining and detent structure as hereinafter brought out.

At 30, there has been indicated the wall or shell of an apparatus such as, for example, a vacuum cleaner assembly. This wall is formed with an opening and a collar 31 is disposed within the opening and secured in position in any desired manner. It will be understood that the apparatus will ordinarily be provided with a pair of these collars; one defining the inlet opening and the other, the exhaust or blower opening. According to the present teachings, the outer face of the collar will present a guiding and bearing portion 32 in the form of an outwardly inclined or concave surface. Beyond this, it may present groups of radially and inwardly extending portions. The bore of collar 31 should incorporate a diameter adequate to accommodate the end of hose extension 16. The surface 32 should generally present a diameter corresponding to that of lip 25'. The length of the extension beyond this lip should be such that it may project inwardly well beyond the collar and bear against the surface of a grommet or sealing washer 39 mounted by the interior wall section 40 of the suction-producing apparatus within shell 30.

The inner annular face of the collar is, as shown in Figs. 1A and 4, divided into a suitable number of sectors, providing groups of components defined by relatively raised and recessed surfaces and each sector beginning with a slot or groove 33. Ordinarily, the collar may include four assemblies of the nature to be described. In that case, these assemblies will have their parts each spaced 90° from adjacent assemblies. Each sector will include an inclined or cam surface 34 communicating with a slot 33 and continued in the form of a shoulder 35 parallel to the outer and inner faces of the assembly. The surface of this shoulder terminates in an edge portion 36 extending parallel to the axis of the collar and providing a stop. Beyond this stop, the body of the material forming the collar presents an edge portion spaced from the adjacent edge defining the end of the inclined surface 34 of a second sector. The space thus furnished provides one of the slots 33. A portion 37 extends inwardly towards the collar axis and preferably adjacent the end of inclined surface 34. This portion provides a part of the detent assembly.

With extension 16 attached to the hose 5 and bushing 23 mounted upon that extension, it may readily be coupled to the collar 31 secured to the shell. To effect this attachment, the extension is simply passed through the bore of the collar with the pins 27 riding through the slots 33. Movement in this direction will be limited by bushing 23. Therefore, after the pins have completely passed through the slots or grooves 33, lip 25' will just engage with surface 32. A rotation of extension 16 will now cause these pins to ride against the edges of inclined or cam portions 34 thus drawing the extension in an axial direction toward shell 30 and moving or flexing lip 25' toward the body of bushing 23 in the manner shown in Fig. 3. As the pins ride past the fixed inwardly extending portions 37, they will shift inwardly and outwardly in a manner permitted by spring 28. Thereupon, they will ride in contact with the shoulder portions 35. This movement of the parts may be continued until the pins are prevented from further movement by engaging stops 36. In such positions, they will prevent a withdrawal of the hose extension 16. Also, they will not accidentally move back down the inclined edges or surfaces 34 because this will be prevented by their engagement with the inwardly extending detent portions 37; a deliberate and forceable rotation of the parts being necessary to cause the pins to override these portions.

As the extension moved inwardly of the collar, the bushing 23 moves with it, as aforedescribed. Accordingly, lip portion 25' of this bushing, in addition to sealingly engaging surface 32, may also have its edge zone shift or curl to a point where it bears against the outer face of the tube extension 16 after relative rotation of the parts is completed. Therefore, it is apparent that as the parts are coupled, a proper type of seal is established and substantially no air leakage will occur at this point. Also, with its inner end braced against grommet 39, or other surface of wall 40, the assembly is stabilized with respect to the apparatus and regardless of whether it is associated with either the suction or blower opening of the same.

Thus, among others, the several objects of the invention as specifically aforenoted are achieved. Obviously, numerous changes in construction and rearrangement of the parts may be resorted to without departing from the spirit of the invention as defined by the claims.

I claim:

1. A coupling including in combination, a collar having a front outer face, said collar being formed in its bore face with groups of relatively raised and recessed surfaces, each group providing a groove extending axially of the collar and having a forward end terminating at the outer face of the latter, a cam edge, a shoulder and a stop portion also provided by a group of such bore surfaces, said cam edges connecting with the rear end of said groove and inclining away from the front collar face to terminate in an end portion, said shoulder connecting with the end portion of said cam edge and extending substantially parallel to the outer face of said collar and terminating in said stop portion, a pipe, pins extending at spaced points from the outer face of said pipe, said pipe being insertible into the bore of said collar to cause the pins to enter said grooves, said pipe being thereupon rotatable in a single direction with respect to said collar to cause said pins to sequentially traverse said cam edges and shoulders to occupy positions adjacent and be completely arrested from further movement in said single direction by said stop portions, said pipe being drawn inwardly of said collar as said pipe is rotated in said single direction with the pins moving in contact with said cam edges, a radially and outwardly inclined annular seal-guiding portion on the outer face of said collar, said seal-guiding portion extending adjacent the bore of said collar, a bushing encircling said pipe, said bushing including an integrally-extending collar-engaging flexible lip portion extending in the direction of the pipe axis and being compressed against substantially the entire seal-guiding portion on the outer face of said collar as a result of said pipe rotating in said single direction and being drawn inwardly of said collar by said pins moving in contact with said cam edges.

2. A coupling including in combination, a collar having a front outer face, said collar being formed in its bore face with groups of relatively raised and recessed surfaces, each group providing a groove extending axially of the collar and having a forward end terminating at the outer face of the latter, a cam edge, a shoulder and a stop portion also provided by a group of such bore surfaces, said cam edge connecting with the rear end of said groove and inclining away from the front collar face to terminate in an end portion, said shoulder connecting with the end portion of said cam edge and extending substantially parallel to the outer face of said collar and terminating in said stop portion, a pipe, pins extending at spaced points from the outer face of said pipe, said pipe being insertible into the bore of said collar to cause the pins to enter said grooves, said pipe being thereupon rotatable in a single direction with respect to said collar to cause said pins to sequentially traverse said cam edges and shoulders to occupy positions adjacent and be completely arrested from further movement in said single direction by said stop portions, said pipe being drawn inwardly of said collar as said pipe is rotated in said single direction with the pins moving in contact with said cam edges and sealing means carried by said pipe and compressed against the outer face of said collar as said pipe is rotated in said single direction to be drawn inwardly of the latter, said collar also having an inner face and being secured to a member having an opening concentric therewith, an apertured wall fixed to said member and spaced from said inner surface with its aperture in line with the collar bore, a pipe-engaging means included on said aperture wall and disposed at the periphery of said aperture for engaging outer surfaces of said pipe, said pipe extending beyond said sealing means and bridging the space between same and said apertured wall to project through said collar bore into the aperture of said wall and be in engagement with said pipe-engaging means.

3. The invention in accordance with claim 1 wherein a detent is also provided by each of said groups, said detent extending inwardly towards the bore axis of said collar at a point spaced from said stop portion and adjacent said end portion of said cam edge, said pins being adapted to over-ride said detents upon rotation of said pipe in said single direction, said pipe having openings through which said pins extend at spaced points from the outer face of said pipe, a spring is secured intermediate its ends to said pipe and mounts one edge of said pins adjacent its ends to project said pins through said openings in said pipe, and said pins are permitted movement in a reverse direction to said single direction upon deliberate and forceful movement of said pins to bias said spring thereby permitting said pins to over-ride said detents.

4. The invention in accordance with claim 1 wherein said pipe is formed with an annular channel in its outer face, said bushing being cylindrical and lying in face-to-face contact with the outer surfaces of said pipe, an inwardly extending flange forming a part of said bushing and said flange bearing against said pipe within said channel to prevent axial movement of said bushing with respect to said pipe.

References Cited in the file of this patent

UNITED STATES PATENTS

| | | |
|---|---|---|
| 628,765 | Collette | July 11, 1899 |
| 1,033,187 | Metzger | July 23, 1912 |
| 1,828,505 | Mahoney | Oct. 20, 1931 |
| 2,146,252 | Ell | Feb. 7, 1939 |
| 2,241,773 | Ernolf | May 13, 1941 |
| 2,523,770 | Marette | Sept. 26, 1950 |
| 2,660,457 | Mallon | Nov. 24, 1953 |
| 2,665,148 | Humphrey et al. | Jan. 5, 1954 |
| 2,755,106 | Brennan et al. | July 17, 1956 |

FOREIGN PATENTS

| | | |
|---|---|---|
| 382,638 | France | Dec. 12, 1907 |